US012042832B2

(12) United States Patent
Yan et al.

(10) Patent No.: US 12,042,832 B2
(45) Date of Patent: Jul. 23, 2024

(54) SEGMENTAL CALENDERING DEVICE FOR FLEXIBLE FLAT CABLE

(71) Applicant: Hongbo Wireless Communication Technology Co., Ltd., Taipei (TW)

(72) Inventors: Hong-Fang Yan, Taipei (TW); Yang-Guo Jiao, Taipei (TW); Dang-She Feng, Taipei (TW)

(73) Assignee: Changshu Hongbo Telecommunication Technology Co., Ltd., Changshu (CN)

( * ) Notice: Subject to any disclaimer, the term of this patent is extended or adjusted under 35 U.S.C. 154(b) by 1249 days.

(21) Appl. No.: 16/568,273

(22) Filed: Sep. 12, 2019

(65) Prior Publication Data

US 2020/0005969 A1 Jan. 2, 2020

Related U.S. Application Data

(62) Division of application No. 15/644,423, filed on Jul. 7, 2017, now Pat. No. 10,460,855.

(51) Int. Cl.

| | |
|---|---|
| ***B21B 1/16*** | (2006.01) |
| ***B21B 31/32*** | (2006.01) |
| ***D21G 1/00*** | (2006.01) |
| ***H01B 7/08*** | (2006.01) |
| ***H01B 13/00*** | (2006.01) |

(Continued)

(52) U.S. Cl.
CPC .............. *B21B 1/166* (2013.01); *B21B 31/32* (2013.01); *H01B 7/0823* (2013.01); *H01R 12/728* (2013.01); *H01R 43/28* (2013.01); *D21G 1/00* (2013.01); *H01B 13/0036* (2013.01)

(58) Field of Classification Search
CPC .......... B21B 1/166; B21B 31/32; D21G 1/00; H01B 13/0036; H01B 7/0823; H01R 12/728; H01R 43/28
See application file for complete search history.

(56) References Cited

U.S. PATENT DOCUMENTS

| | | | | |
|---|---|---|---|---|
| 5,527,997 | A | 6/1996 | Saen et al. | |
| 10,460,855 | B2 * | 10/2019 | Yan ...................... | H01R 12/728 |
| 2011/0139500 | A1 | 6/2011 | Hara | |

(Continued)

*Primary Examiner* — Minh N Trinh
(74) *Attorney, Agent, or Firm* — OPES TP Consulting Co., Ltd.

(57) ABSTRACT

A segmental calendering device includes a framework, a pair of left-rolling sliding guide mechanism, a pair of right-rolling sliding guide mechanisms, an upper-calendering roller and a supporting mechanism of the upper-calendering roller, a lower-calendering roller as well as a pressing mechanism. The upper-calendering roller is rotatably supported within the supporting mechanism of the upper-calendering roller and disposed above a position between a left wallboard and a right wallboard of the framework, and the supporting mechanism of the upper-calendering roller slides along the pair of left-rolling sliding guide mechanisms and the pair of right-rolling sliding guide mechanisms. The lower-calendering roller is disposed below the upper-calendering roller correspondingly and rotatably supported between the left wallboard and the right wallboard. The pressing mechanism is for applying a pressure on the supporting mechanism of the upper-calendering roller and for adjusting the pressure.

7 Claims, 11 Drawing Sheets

(51) Int. Cl.
*H01R 12/72* (2011.01)
*H01R 43/28* (2006.01)

(56) References Cited

U.S. PATENT DOCUMENTS

| | | | | |
|---|---|---|---|---|
| 2014/0090883 | A1 | 4/2014 | Gundel | |
| 2019/0013117 | A1* | 1/2019 | Yan | H01R 43/28 |

* cited by examiner

SEGMENTAL CALENDERING DEVICE FOR FLEXIBLE FLAT CABLE

CROSS REFERENCE TO RELATED APPLICATION

This application is a divisional application of, and claims priority to, U.S. application Ser. No. 15/644,423, filed on Jul. 7, 2017, now U.S. Pat. No. 10,460,855, which is hereby incorporated by reference in its entirety.

FIELD

The disclosure relates to the field of mechanical techniques of a calendering device for cables, more particularly to a segmental calendering device for flexible flat cables.

BACKGROUND

The number of cables and the spaces between neighboring cables of a flexible flat cable could be selected according to technological demands. The kind of flexible flat cables has advantages of easy-connection, minimizing electrical products, reducing costs and raising production efficiency. The kind of flexible flat cables are widely applied between moving parts and a baseboard, between a PCB board and another PCB board, digital transmission lines of electrical equipment and televisions, etc. A flexible flat cable as a whole with an insulation film (polyimide film or other similar films such as PET film) applied usually has a plurality of single cables. The technology is that: when a traction device such as a rolling device is in operation, a plurality of winding rolls back out a plurality of cables and the cables are applied with insulation films as passing through an station of insulation film, and then the cables are cut according to a length of technological demands and further electrically connected to plug-in components.

As the industry knows, if the spaces between a plurality of cables remain unchanged, then it would result in the following technical problems: first, the volumes of plug-in components electrically connected to the cables become larger so that negative effects for product miniaturization as well as wastes of resources are raised; secondly, risks of short-circuit of cables are increased, especially the possibility of short-circuit becomes high when the spaces between the cables are decreased for reducing the size of plug-in components; third, welding qualities between cables and plug-in components are not reliable because cross-sections of the cables are rounded. Of course, if the parts connecting between the cables and the plug-in components are designed in form of flat shape and the cross-sections of the rest of parts remain in form of rounded shape, then the above technical problems could be solved. By designing the parts connecting between the cables and the plug-in components in form of flat shape, the reliability of connections between the cables and the plug-in components could be achieved and the overall volumes of plug-in components could be reduced. Even though the spaces between the cables are reduced, the phenomena of short-circuit would not occur because of limitations of the plug-in components. The spaces between those neighboring cables are significantly greater than the spaces between the parts connecting the cables and the plug-in components since the cross-sections of the rest of parts remain in form of rounded shape.

From the above descriptions, it is founded that the above technical problems could be completely solved if a calendering device capable of forming segmental flat regions on lengthways of a plurality of cables using a method of segmental calendering are provided. The method of segmental calendering means that a flat region and a round region alternately exist in form of one by one cycle. The flat region is the region generated by the calendering device using the method of calendering, and the rounded region is the non-flat region that is not generated by the calendering device using the method of calendering.

There are messages about the techniques of cable calendering in public Chinese patents. For example, the Chinese patent of public No. CN202070548U discloses "Metal wire calendering device directly driven by servo motors". The aforementioned technical solution could be achieved by this patent. However, the technical contents of this patent are based on the method of calendering for designing the whole cable in form of flat shape. In other words, this patent does not teach the method of segmental calendering. Similarly, the Chinese patent of public No. CN203591994U discloses "Lead wire rolling mill", which is not capable of designing cables in form of segmental flat regions.

The number of cables varies within a variety of products. Therefore, it is necessary to manufacture a number of flexible flat cables according to their electrical performances. However, in this condition, it is inconvenient to use flexible flat cables since the specifications of flexible flat cables become complicated and the commonality of flexible flat cables is reduced. Moreover, the spaces between conductors of existing flexible flat cables are controlled and arranged by a spacing-control rod. However, the spaces between conductors are controlled fixedly by the spacing-control rod. It means that a single spacing-control rod is only capable of achieving a single specification of space for flexible flat cables. It is necessary to replace the spacing-control rod with another spacing-control rod if it is desired to producing flexible cables having variable specifications of spaces. Another technical problem is that the changes on the spaces between conductors could not be achieved in a single flexible flat cable, and it results in limitations of structural designs of products. In view of this, the Chinese patent (CN205355693U) discloses "Flexible flat cable conductor controlling means that arranges". The device of this Chinese patent includes two guide pillar fixed plates, two bush fixed plates, two displacement cylinders, a fixed plate, two component boards, two transmission pieces and an interval wheel set. The left component board is disposed on the top of the left bush fixed plate, the left transmission piece is installed on the left component board, and the left displacement cylinder and the right displacement cylinder are fixed to the fixed plate. The right component board is disposed on the top of the right bush fixed plate, and the right transmission piece is installed on the right component board. The fixed plate is positioned and fixed to the left guide pillar fixed plate and the right guide pillar fixed plate. The left displacement cylinder is connected to the left transmission piece, and the right transmission piece is connected to the right displacement cylinder. The left bush fixed plate and the right bush fixed plate are respectively connected to the left guide piece and the right guide piece through a bearing. The technical solution of this patent is that variable conductions outputted by the cylinder are provided to the component boards, transmission pieces and guide piece for achieving PIN wheel set. The technical solution of this patent achieves the productions of flexible flat cables having variable conductor spaces, but the controlling effects provided the technical solution is not good enough. The outputs of the cylinders could not be controlled precisely and it would result in problems of broken conductors and deviations of spaces.

SUMMARY

According to one embodiment of the present disclosure, a segmental calendering device for a flexible flat cable is disclosed. The device includes a framework, a pair of left-rolling sliding guide mechanism, a pair of right-rolling sliding guide mechanisms, an upper-calendering roller and a supporting mechanism of the upper-calendering roller, a lower-calendering roller as well as a pressing mechanism. The framework includes a left wallboard, a right wallboard, a supporting bar and a frame roof. The right wallboard is disposed opposite to the left wallboard. A left rolling chamber is formed in the left wallboard, and a right rolling chamber, corresponding to the left rolling chamber, is formed in the right wallboard. The right rolling chamber has the same shape and size as the left rolling chamber. The supporting bar is connected between the left wallboard and the right wallboard. A left end of the frame roof is fixed to a top of the left wallboard, and a right end of the frame roof is fixed to a top of the right wallboard. The pair of left-rolling sliding guide mechanisms is fixed opposite to each other within the left rolling chamber. The pair of right-rolling sliding guide mechanisms is fixed opposite to each other within the right rolling chamber. The upper-calendering roller is rotatably supported within the supporting mechanism of the upper-calendering roller and disposed above a position between the left wallboard and the right wallboard, and the supporting mechanism of the upper-calendering roller slides along the pair of left-rolling sliding guide mechanisms and the pair of right-rolling sliding guide mechanisms. The lower-calendering roller is disposed below the upper-calendering roller correspondingly and rotatably supported between the left wallboard and the right wallboard. The pressing mechanism is for applying a pressure on the supporting mechanism of the upper-calendering roller and for adjusting the pressure. The pressing mechanism is disposed on the frame roof and connected to the supporting mechanism of the upper-calendering roller.

According to one embodiment of the present disclosure, the segmental calendering device for the flexible flat cable further includes a conductor-space controlling pole of flexible flat cable. The space-controlling pole includes a mandrel, at least one positioning wheel fixed to the mandrel, a rod group, a left-control block and a right-control block slidably disposed on the mandrel. A left-pin wheel group sliding along the mandrel is disposed on a left side of the positioning wheel, and a right-pin wheel group sliding along the mandrel is disposed on a right side of the positioning wheel. The left-pin wheel group and the right-pin wheel group are constructed as a set of wheel groups, and each of two sides of the set of wheel groups is disposed with a fixing wheel fixed to the mandrel. The rod group includes a left merging rod, a left separating rod, a right merging rod and a right separating rod. The left merging rod is connected to a first pin wheel of a left-side of the left-pin wheel group, and the right merging rod is connected to a right-side pin wheel of the right-pin wheel group. The left separating rod toggles from a second pin wheel of the left-side of the left-pin wheel group to a pin wheel of a right-side of the left-pin wheel group when shifting left. The right separating rod toggles from a second pin wheel of the right-side of the left-pin wheel group to a pin wheel of a left-side of the left-pin wheel group when shifting right. The left-control block is connected to the left merging rod and the left separating rod, and the right-control block is connected to the right merging rod and the right separating rod.

According to one embodiment of the present disclosure, a flexible flat round conductive cable is disclosed. The flexible flat round conductive cable includes a flexible flat cable. The flexible flat cable has a plurality of round cable segments, with each of the plurality of round cable segments has the same width. Each of the plurality of round cable segments includes a plurality of cables arranged in parallel and in an equal space as well as two insulation films respectively disposed on an upper surface and a lower surface of the plurality of cables. The plurality of cables are round conductors, and the plurality of round cable segments are molded by a sub-rolling performed by the segmental calendering device for flexible flat cable mentioned above.

DETAILED DESCRIPTION OF THE DISCLOSURE

Figure 1:
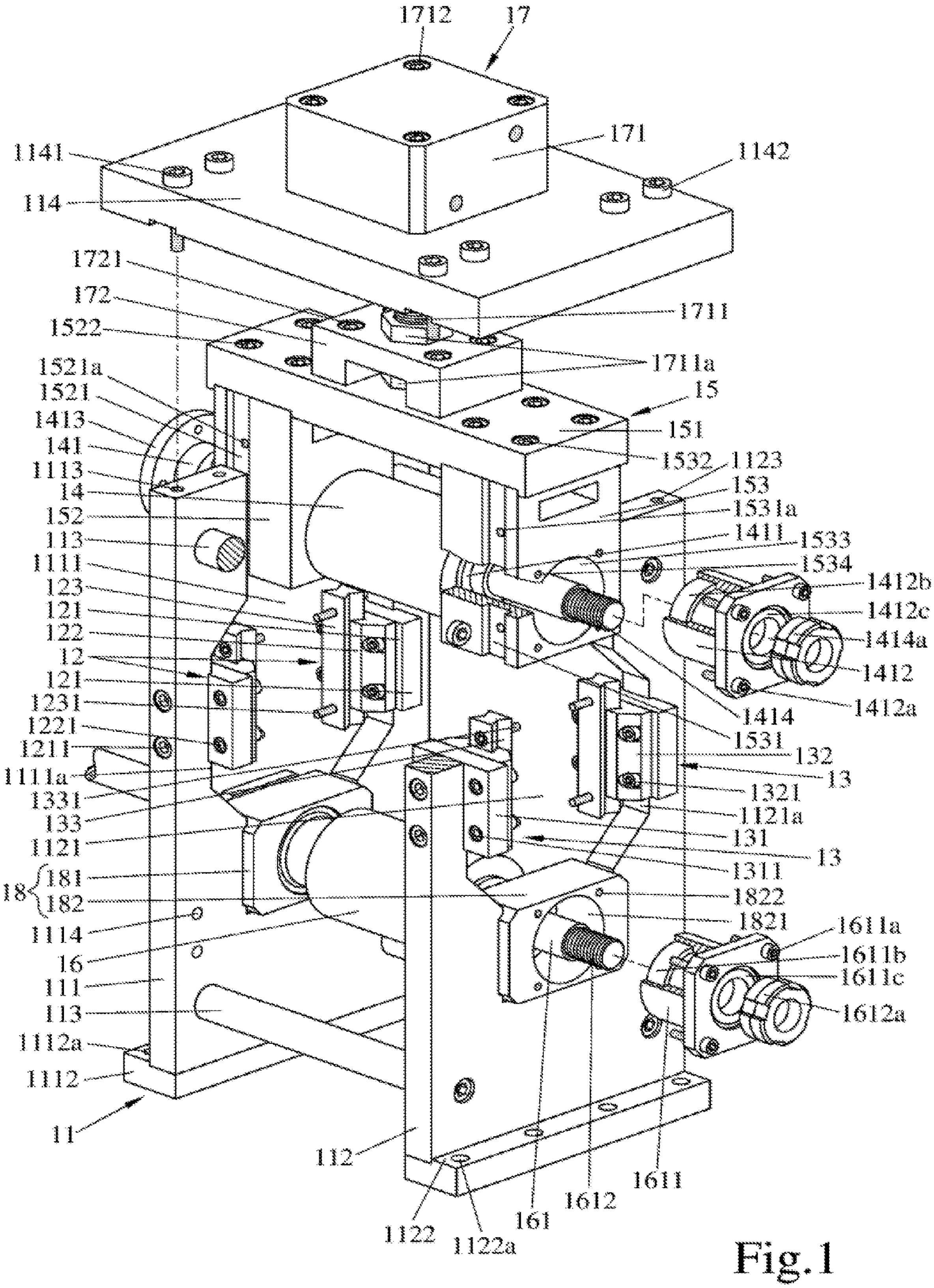
FIG. 1 is a diagram of a structure according to one embodiment of the present disclosure.

Please refer to FIG. 1, which shows a framework 11. The framework 11 includes a left wallboard 111, a right wallboard 112, a supporting bar 113 and a frame roof 114. The left wallboard 111 and the right wallboard 112 are disposed opposite to each other. A left rolling chamber 1111 is formed on the left wallboard 111. A right rolling chamber 1121 is formed on the right wallboard 112 and corresponding to the left rolling chamber 1111. The right rolling chamber 1121 has the same shape and size as the left rolling chamber 1111. Because of the left rolling chamber 1111, the left wallboard 111 approximately presents in form of Y-shape structure. Because of the right rolling chamber 1121, the right wallboard 112 approximately presents in form of Y-shape structure. A left fixing screw hole 1113 of the frame roof 114 is formed on the top of the left wallboard 111, and a right fixing screw hole 1123 of the frame roof 114 is formed on the top of the right wallboard 112. A bracket fixing screw hole 1114 of the left wallboard 111 is formed one side of the bottom of left wallboard 111, wherein the side of the bottom of left wallboard 111 faces toward the right wallboard 112. A bracket fixing screw hole (not shown in figure) of the right wallboard 112 is formed one side of a bottom of the right wallboard 112, wherein the side of the bottom of right wallboard 112 faces toward the left wallboard 111. The supporting bar 113 is fixed between the left wallboard 111 and the right wallboard 112. As shown in FIG. 1, the number of the supporting bar 113 is four. The two supporting bars among the said four supporting bars are disposed in parallel with each other in the upper part, and the other two supporting bars among the said four supporting bars are disposed in parallel with each other in the lower part. Thereby, the left wallboard 111 and the right wallboard 112 are formed as a firm structure through the supporting bar 113. The left end of the frame roof 114 is fixed to the top of the left wallboard 111. Specifically, both of a left fixing screw 1141 of the frame roof 114 and a left fixing screw hole 1113 of the frame roof 114 are used for fixing the left end of the frame roof 114 to the top of the left wallboard 111. The right end of the frame roof 114 is fixed to the top of the right wallboard 112. Specifically, both of a right fixing screw 1142 of the frame roof 114 and a right fixing screw 1123 of the frame roof 114 are used for fixing the right end of the frame roof 114 to the top of the right wallboard 112.

A pair of left-rolling sliding guide mechanisms 12 is provided. The pair of left-rolling sliding guide mechanisms 12 is fixed opposite to each other within the left rolling chamber 1111. A pair of right-rolling sliding guide mechanisms 13 is provided. The pair of right-rolling sliding guide mechanisms 13 is disposed opposite to each other within the right rolling chamber 1121. An upper-calendering roller 14 and a supporting mechanism 15 of the upper-calendering roller 14 are provided. The upper-calendering roller 14 is rotatably supported within the supporting mechanism 15 of the upper-calendering roller 14 and disposed above a position between the left wallboard 111 and the right wallboard 112. The supporting mechanism 15 of the upper-calendering roller 14slides along the pair of left-rolling sliding guide mechanisms 12 as well as the pair of right-rolling sliding guide mechanisms 13. A lower-calendering roller 16 is provided. The lower-calendering roller 16 is disposed below the upper-calendering roller 14 correspondingly and rotatably supported between the left wallboard 111 and the right wallboard 112. A pressing mechanism 17 is provided for applying a pressure on the supporting mechanism 15 of the upper-calendering roller 14 and adjusting the pressure. The pressing mechanism 17 is disposed on the frame roof 114 and connected to the supporting mechanism 15 of the upper-calendering roller 14.

As shown in FIG. 1, a left-wallboard base 1112 is fixed to a bottom of the left wallboard 111, and a left-wallboard base fixing hole 1112*a* is disposed on the left-wallboard base 1112. A right-wallboard base 1122 is fixed to a bottom of the right wallboard 112, and a right-wallboard base fixing hole 1122*a* is disposed on the right-wallboard base 1122. Both of the left wallboard 111 and the right wallboard 112 could be fixed to a ground (e.g. a base or an embedded part) by applying screws on the left-wallboard base fixing hole 1112*a* and the right-wallboard base fixing hole 1122*a*.

Each of two chamber walls of the left rolling chamber 1111has a recess of left-rolling sliding guide mechanism 1111*a*, and the two chamber walls of the left rolling chamber 1111are opposite to each other. Each of two chamber walls of the right rolling chamber 1121 has a recess of right-rolling sliding guide mechanism 1121*a*, and the two chamber walls of the right rolling chamber 1121 are opposite to each other. The pair of left-rolling sliding guide mechanisms 12 is disposed within the left rolling chamber 1111, with the pair of left-rolling sliding guide mechanisms 12 corresponding to the recess of left-rolling sliding guide mechanism 1111*a*. The pair of right-rolling sliding guide mechanisms 13 is disposed within the right rolling chamber 1121, with the pair of right-rolling sliding guide mechanisms 13 corresponding to the recess of right-rolling sliding guide mechanism 1121*a*.

The upper-calendering roller 14 has an upper-calendering roller shaft 141 rotatably supported in the supporting mechanism 15 of the upper-calendering roller 14. The lower-calendering roller 16 has a lower-calendering roller shaft 161rotatably supported between the left wallboard 111 and the right wallboard 112 through the supporting mechanism 18 of the lower-calendering roller 16, and the pressing mechanism 17 is disposed at center of an upward side of the frame roof 114.

Each of the pair of the left-rolling sliding guide mechanisms 12 comprises a left sliding-block base 121, a left sliding-block 122 and a left sliding guide 123. The left sliding-block base 121 is fixed to a bottom of the recess of left-rolling sliding guide mechanism 1111*a* by using a left sliding-block base screw 1211. The left sliding-block 122 is fixed to the left sliding-block base 121 by using a left sliding-block screw 1221, and the left sliding-block 122 is capable of sliding along the left sliding guide 123. Each of the pair of the right-rolling sliding guide mechanisms 13 comprises a right sliding-block base 131, a right sliding-block 132 and a right sliding guide 133. The right sliding-block base 131 is fixed to a bottom of the recess of right-rolling sliding guide mechanism 1211*a* by using a right sliding-block base screw 1311. The right sliding-block 132 is fixed to the right sliding-block base by using a right sliding-block screw 1321, and the right sliding-block 132capable of sliding along the right sliding guide 133. As shown in FIG. 1, a pair of left sliding guide screw 1231 is disposed on the left sliding guide 123, and a pair of right sliding guide screw 1331 is disposed on the right sliding guide 133.

Please further refer to FIG. 1, the supporting mechanism 15 of the upper-calendering roller 14 includes a plate 151, a left-supporting base 152 for the upper-calendering roller 14 and a right-supporting base 153 for the upper-calendering roller 14. The left-supporting base 152 for the upper-calendering roller 14 is fixed to a downward side of a left end of the plate 151using a left-supporting base screw 1522, and a left-rolling guiding groove 1521 is formed on the left-supporting base 152 for the upper-calendering roller 14, with the left-rolling guiding groove 1521 corresponding to the left sliding guide 123. A pair of left sliding guide screw hole 1521*a* is formed within the left-rolling guiding groove 1521, and the pair of left sliding guide screw 1231 is fixed to the pair of left sliding guide screw hole 1521*a*. The right-supporting base 153 for the upper-calendering roller 14 is fixed to a downward side of a right end of the plate 151 by using a right-supporting base screw 1532, with the right-supporting base 153 for the upper-calendering roller 14 corresponding to the left-supporting base 152 for the upper-calendering roller 14. A right-rolling guiding groove 1531 is formed on the right-supporting base 153 for the upper-calendering roller 14, with the right-rolling guiding groove 1531 corresponding to the left sliding guide 133. A pair of left sliding guide screw hole 1531*a* is formed within the right-rolling guiding groove 1531, and the pair of right sliding guide screw 1331 is fixed to the pair of right sliding guide screw hole 1531*a*. Therefore, the left sliding guide 123 is fixed to the left-supporting base 152 for the upper-calendering roller 14 in a position corresponding to the left-rolling guiding groove 1521, and the right sliding guide 133 is fixed to the right-supporting base 153 for the upper-calendering roller 14 in a position corresponding to the right-rolling guiding groove 1531. The pressing mechanism 17disposed on the frame roof 114 is fixed to an upward side of the plate 151. As shown in FIG. 1, a left end of the upper-calendering roller shaft 141 is rotatably supported on the left-supporting base 152 for the upper-calendering roller 14, and a right end of the upper-calendering roller shaft 141 is rotatably supported on the right-supporting base 153 for the upper-calendering roller 14.

The pressing mechanism 17 includes a pressure applied cylinder 171 and a cylinder base 172. The pressure applied cylinder 171 is fixed to an upward side of the frame roof 114*by* using a pressure applied cylinder screw 1712 and a cylinder pillar 1711 of the pressure applied cylinder 171 faces downward and is fixed to the cylinder base 172 by pass through the frame roof 114. The cylinder base 172 is fixed to a side of the plate 151, with the side of the plate 151 facing the frame roof 114. In order to ensure the connection between the cylinder pillar 1711 of the pressure applied cylinder 171 and the cylinder base 172, a pair of lock nuts 1711*a* are disposed on the cylinder pillar 1711 of the pressure applied cylinder 171, and respectively corresponding to the upper position and the lower position of the cylinder base 172. In this embodiment, the cylinder base 172 is fixed to the plate 151 by using a cylinder base screw 1721.

In this embodiment, the pressure applied cylinder 171 is an oil cylinder. However, if the oil cylinder is replaced with an air cylinder for the purpose of avoiding, then it should be considered as an equivalent substitution. Moreover, the pressure of the pressure applied cylinder 171 could be adjusted according to actual demands, such that the pressure applied onto the plate 151 is changed and then the pressure could be remained after adjusting the pressure.

Figure 2:
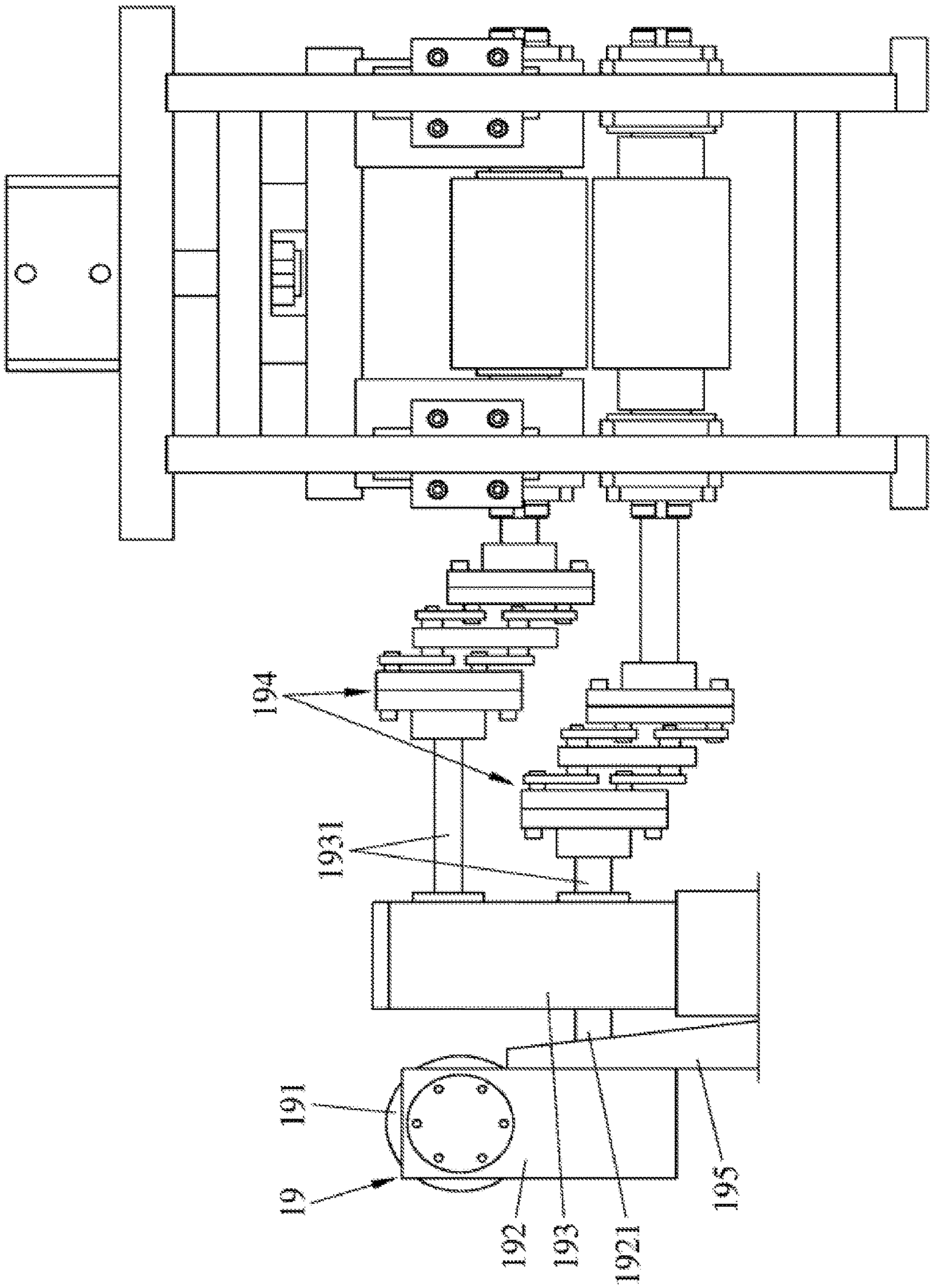
FIG. 2 is a diagram of the structure of FIG. 1 connected to a power mechanism.

Please still refer to FIG. 1, each of a left end and a right end of the upper-calendering roller shaft 141 has an inner bearing 1411 and a bearing base 1412 of the upper-calendering roller shaft 141, both of the inner bearing 1411 of the left end of the upper-calendering roller shaft 141 and the bearing base 1412of the upper-calendering roller shaft 141 operate with the left-supporting base 152 for the upper-calendering roller 14. Both of the inner bearing 1411 of the right end of the upper-calendering roller shaft 141 and the bearing base 1412 of the upper-calendering roller shaft 141 operate with the right-supporting base 153 for the upper-calendering roller 14. As shown in FIG. 1, the left end of the upper-calendering roller shaft 141 extends out of the left-supporting base 152 for the upper-calendering roller 14 and is fixed with a power plate 1413 configured to be connected to a power mechanism 19(as shown in FIG. 2).

The supporting mechanism 18 of the lower-calendering roller 16 comprises a left-supporting base 181 of the lower-calendering roller 16 and a right-supporting base 182 of the lower-calendering roller 16. The left-supporting base 181 of the lower-calendering roller 16 is disposed on the left wallboard 111 and corresponding to a bottom of the left rolling chamber 1111. The right-supporting base 182 of the lower-calendering roller 16 is disposed on the right wallboard 112 and corresponding to a bottom of the right rolling chamber 1121. A left end of the lower-calendering roller shaft 161 is supported on the left-supporting base 181 of the lower-calendering roller 16 through a bearing base 1611 of the lower-calendering roller shaft 161, and a right end of the lower-calendering roller shaft 161 is supported on the right-supporting base of the lower-calendering roller 182 through the bearing base 1611 of the lower-calendering roller shaft 161. As shown in FIG. 1, the left end of the lower-calendering roller shaft 161 extends out of the left-supporting base 181 of the upper-calendering roller 14 to be connected to the power mechanism 19.

FIG. 1 shows a specific structure of a bearing base 1412 of the upper-calendering roller shaft 141. In an example of the bearing base 1412 of the upper-calendering roller shaft 141operating with the right-supporting base 153 for the upper-calendering roller 14, the bearing base 1412 of the upper-calendering roller shaft 141 is disposed within a chamber 1533 of the bearing base 1412 of the upper-calendering roller shaft 141, disposed in advanced on the right-supporting base 153 for the upper-calendering roller 14. A set of first fixing screws 1412*a* as well as a first fixing screw hole 1534disposed in advanced on the right-supporting base 153 for the upper-calendering roller 14 are used for fixing the bearing base 1412 of the upper-calendering roller shaft 141 to the chamber 1533 of the bearing base 1412 of the upper-calendering roller shaft 141. A middle shaft 1412*b* and a first external shaft 1412 care disposed within the bearing base 1412 of the upper-calendering roller shaft 141. The right end of the upper-calendering roller shaft 141 and the middle shaft 1412*b* as well as the first external shaft 1412*c* operate rotatably. A shaft head 1414 (having screw thread) on the right end of the upper-calendering roller shaft 141 extends out of the bearing base 1412 of the upper-calendering roller shaft 141, and a fasten screw nuts 1414*a* is applied to the shaft head 1414 such that the bearing base 1412 of the upper-calendering roller shaft 141 is accurately positioned. Since the operation of the bearing base 1412 of the upper-calendering roller shaft 141 with the left-supporting base 152for the upper-calendering roller 14 is similar to the operation of the bearing base 1412 of the upper-calendering roller shaft 141 with the right-supporting base 153 for the upper-calendering roller 14, further explanations about how the left end of the upper-calendering roller shaft 141 operates with the bearing base 1412 of the upper-calendering roller shaft 141 is not given.

FIG. 1 further shows a specific structure of the bearing base 1611 of the lower-calendering roller shaft 161 on the left end and the right end of the lower-calendering roller shaft 161. In an example of the bearing base 1611 of the lower-calendering roller shaft 161 operating with the right-supporting base 182of the lower-calendering roller 16, the bearing base 1611 of the lower-calendering roller shaft 161 is disposed within a chamber 1821 of the bearing base 1611 of the lower-calendering roller shaft 161 disposed in advanced on the right-supporting base 182 for the lower-calendering roller 16. A set of second fixing screws 1611*a* as well as a second fixing screw hole 1822 disposed in advanced on the right-supporting base 182 for the lower-calendering roller 16 are used for fixing the bearing base 1611 of the lower-calendering roller shaft 161 to the chamber 1821 of the bearing base 1611 of the lower-calendering roller shaft 161. A left shaft 1611*b* and a second external shaft 1611 care disposed within the bearing base 1611 of the lower-calendering roller shaft 161. The right end of the lower-calendering roller shaft 161 and the left shaft 1611*b* as well as the second external shaft 1611*c* operate rotatably. A shaft head 1612 on the right end of the lower-calendering roller shaft 161 (having screw thread) extends out of the bearing base 1611 of the lower-calendering roller shaft 1611, and a fasten screw nuts 1612*a* is applied to the shaft head 1612 such that the bearing base 1611 of the lower-calendering roller shaft 161 is accurately positioned. Since the operation of the bearing base 1611 of the lower-calendering roller shaft 161 with the left-supporting base 181 for the lower-calendering roller 16 is similar to the operation of the bearing base 1611 of the lower-calendering roller shaft 161 with the right-supporting base 182 for the lower-calendering roller 16, a further explanation about how the left end of the lower-calendering roller shaft 161 operates with the bearing base 1611 of the lower-calendering roller shaft 161 is not given.

Please refer to FIG. 2 as well as FIG. 1 showing a power mechanism 19. The power mechanism 19 includes a motor 191, a first speed reducer 192, a second speed reducer 193and a Schmidt parallel coupling 194. The motor 191 operates with the first speed reducer 192, and the first speed reducer 192 as well as the motor 191 is fixed to a stand 195. A first output shaft 1921 of the first speed reducer 192 is connected to a second input shaft of the second speed reducer 193. The second speed reducer 193 is disposed on the stand 195, and a pair of second output shafts 1931 of the second speed reducer 193 is connected to the Schmidt parallel coupling 194. The left end of the upper-calendering roller shaft 141and the lower-calendering roller shaft 142 are connected to the Schmidt parallel coupling 194.

Figure 3:
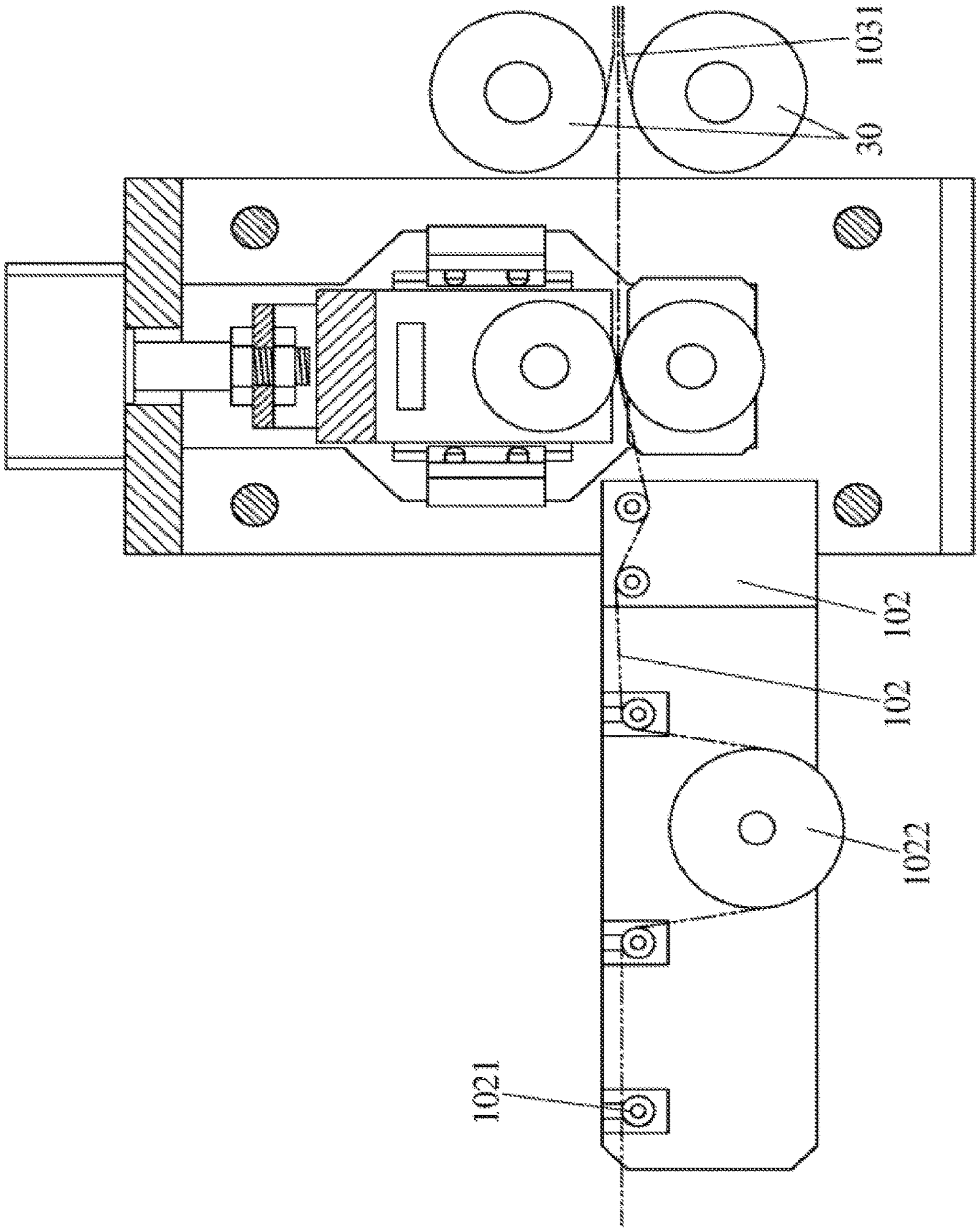
FIG. 3 is a diagram according to an application embodiment of the present disclosure.
Figure 4:
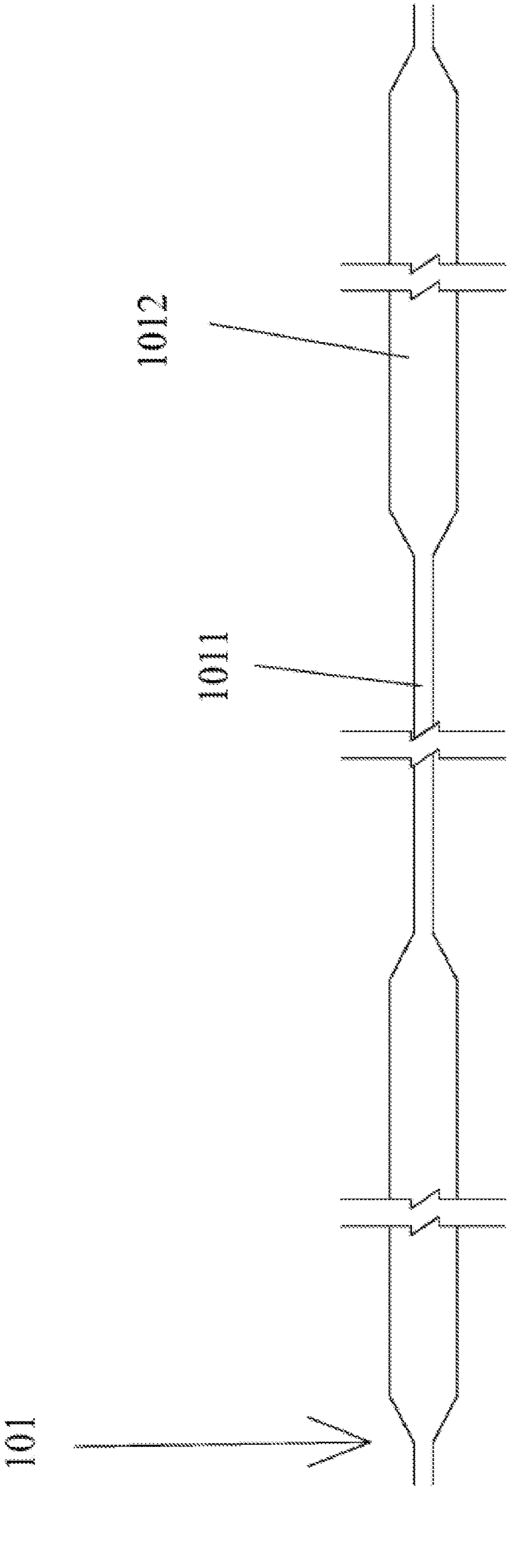
FIG. 4 is a structural diagram of cables rolled by FIG. 3.

The operation of the motor 191 is slowed down by the first speed reducer 192 and the second speed reducer 193 driven by the first speed reducer 192. The pair of second output shafts 1931 of the second speed reducer 193 drives the upper-calendering roller shaft 141 and the lower-calendering roller shaft 161 to operate through the Schmidt parallel coupling 194. The upper-calendering roller 14 is disposed on the supporting mechanism 15 of the upper-calendering roller 14 through the upper-calendering roller shaft 141, and the left-supporting base 152 for the upper-calendering roller 14 of the supporting mechanism 15 of the upper-calendering roller 14 slidably operates with the pair of left-rolling sliding guide mechanisms 12, and the right-supporting base 153 for the upper-calendering roller 14 of the supporting mechanism 15of the upper-calendering roller 14 slidably operates with the pair of right-rolling sliding guide mechanisms 13, so sometimes the upper-calendering roller 14 moves toward the lower-calendering roller 16, or sometimes moves departing from the lower-calendering roller 16. That is a performance of up-down movement. Specifically, when the upper-calendering roller 14 moves downward, with the operation of the lower-calendering roller 16, a plurality of cables 101 (as shown in FIG. 3 and FIG. 4) could be rolled as passing through the upper-calendering roller 14 and the lower-calendering roller 16. On the contrary, the rolling process for the cable 101 would be terminated.

Please refer to FIG. 3 and FIG. 4 in combination with FIG. 1and FIG. 2, the bracket fixing screw hole 1114 on the left wallboard 111 and a bracket 102 connected to a fixing screw on the right wallboard 112 are given. A guide roller 1021 and a tension roller 1022 are disposed on the bracket 102. A plurality of cables 101, having round cross-sections, move from left to right between the upper-calendering roller 14 and the lower-calendering roller 16 (as shown in FIG. 3) under the operations of a traction device or a rolling device. After the cables 101 move out of the upper-calendering roller 14 and the lower-calendering roller 16, an insulation film of an insulation film roll 103 is placed onto the cables 101. When the cables 101 pass through the upper-calendering roller 14and the lower-calendering roller 16, the cables 101 present in form of the structure shown in FIG. 4 according to the above descriptions of FIG. 2. In other words, a flat region 1011 and a non-flat round conductor region 1012 are formed on the cables 101. The flat region 1011 and the round conductor region 1012 alternately exist in form of one by one cycle. There is no doubt that the flat region 1011 is rolled by the upper-calendering roller 14 and the lower-calendering roller 16. The round conductor region 1012 represents the round sections of the cables 101. In the embodiments of the present disclosure, the cables 101, having rounded sections of a diameter of 0.3 mm, are rolled to be a flexible flat cable having a flat region of thickness of 0.115 mm.

Figure 5:
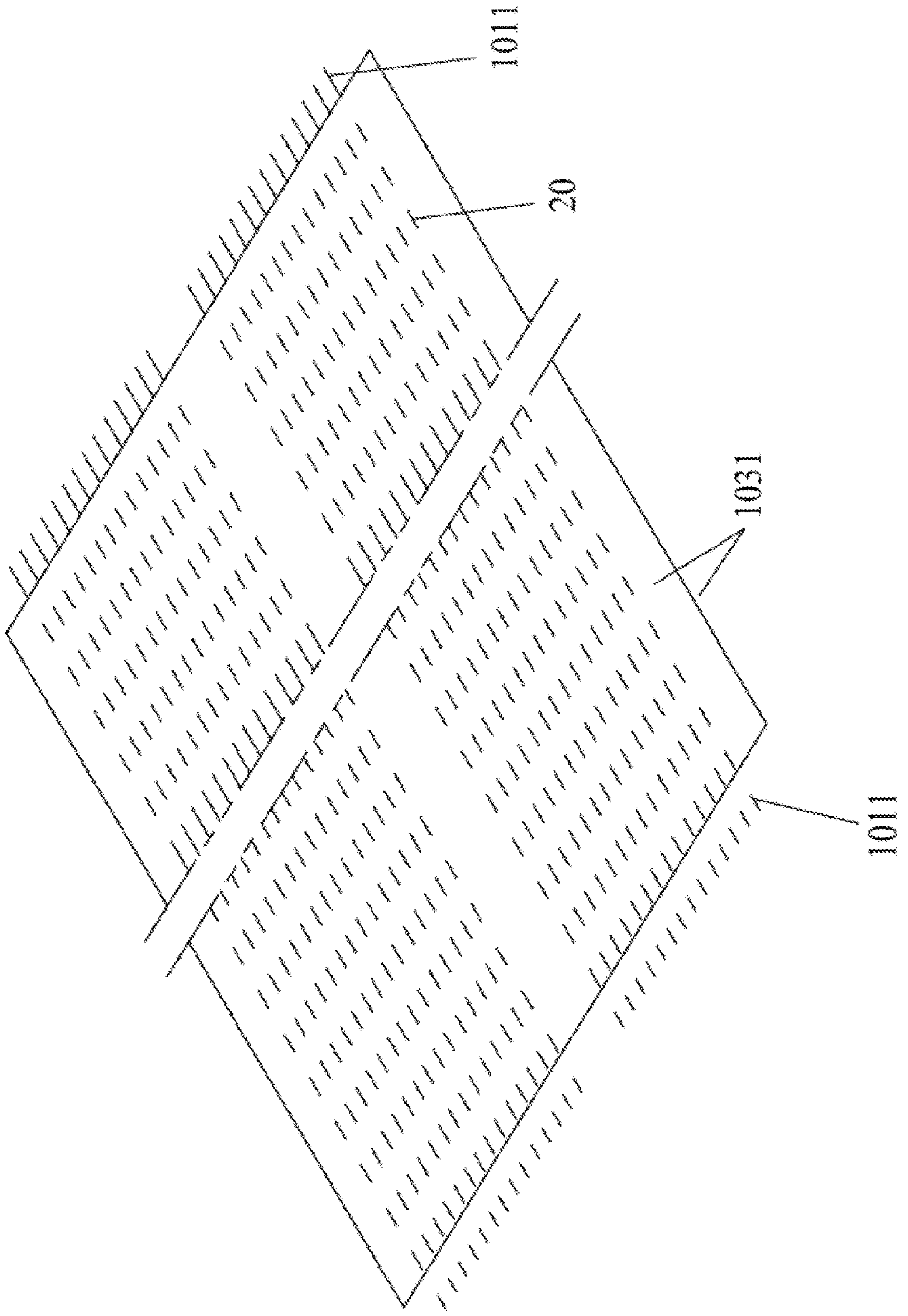
FIG. 5 is a diagram of a plurality of cables of FIG. 4 applied with insulation films and cut into segments.

Please refer to FIG. 5, the plurality of cables 101, applied with an insulation film 1031, are cut into segments according to actual demands, such that the flat regions 1011 on two ends of the cables 101 are capable of being welded with other plug-in components. The middle region having round sections is the original structure of the cables 101. Electrical clearances could be achieved by spaces between the cables 101, so that short-circuit could be avoided at in-use state.

According to professional knowledge, in the condition that the rotation speeds of the upper-calendering roller 14 and the lower-calendering roller 16 remain unchanged, the changes on the line speeds of the cables 101 would correspondingly result in changes on the number of the flat region 1011 within the range of lengths of the cables 101. On the other hand, in the condition that the line speeds of the cables 101 remain unchanged, the changes on the rotation speeds of the upper-calendering roller 14 and the lower-calendering roller 16would correspondingly result in changes on the number of the flat region 1011 within the range of lengths of the cables 101.

In the above embodiments, the pair of left-rolling sliding guide mechanisms 12 and the pair of right-rolling sliding guide mechanisms 13 are respectively disposed within the left rolling chamber 1111 and the right rolling chamber 1121, and the upper-calendering roller 14 is rotatably disposed on the supporting mechanism 15 of the upper-calendering roller 14slidably operating with the pair of left-rolling sliding guide mechanisms 12 and the pair of right-rolling sliding guide mechanisms 13. Thereby, when the power mechanism drives the upper-calendering roller 14 to operate, the upper-calendering roller 14 performs in form of up-down movement, with operation of the supporting mechanism 15 of the upper-calendering roller 14. Thereby, each of a plurality of cables passing through an area between the upper-calendering roller 14 and the lower-calendering roller 16 can form a structure along the longitudinal direction of said cables that have round cross-sections, with said structure having flat regions and non-flat, round regions alternatively arranged. The cables could be easily welded with other flat and small plug-in components after cutting into segments. Since the distances of the electrical clearances on the non-flat regions of neighboring cables is capable of remaining greater than the distances of the electrical clearances on the flat regions, the phenomena of short-circuit could be avoided at in-use state. In brief, in the segmental calendering device for the flexible flat cable of the present disclosure, an ideal balance is obtained between the condition that the cables 101 could be easily welded with other plug-in components and the condition that short-circuit could be avoided.

Figure 6:
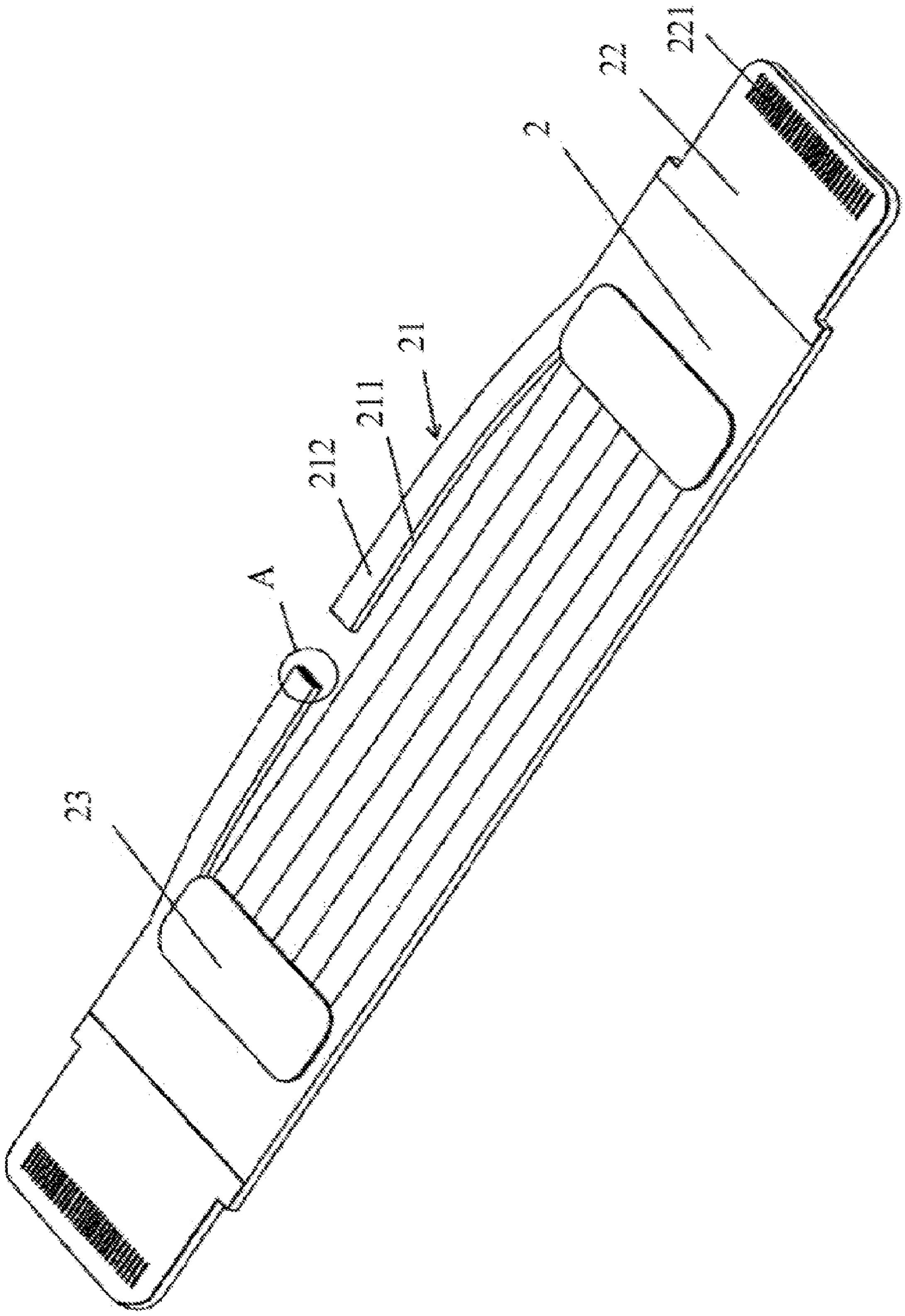
FIG. 6 is an overall structural diagram of a flexible flat round conductive cable according to one embodiment of the present disclosure.
Figure 7:
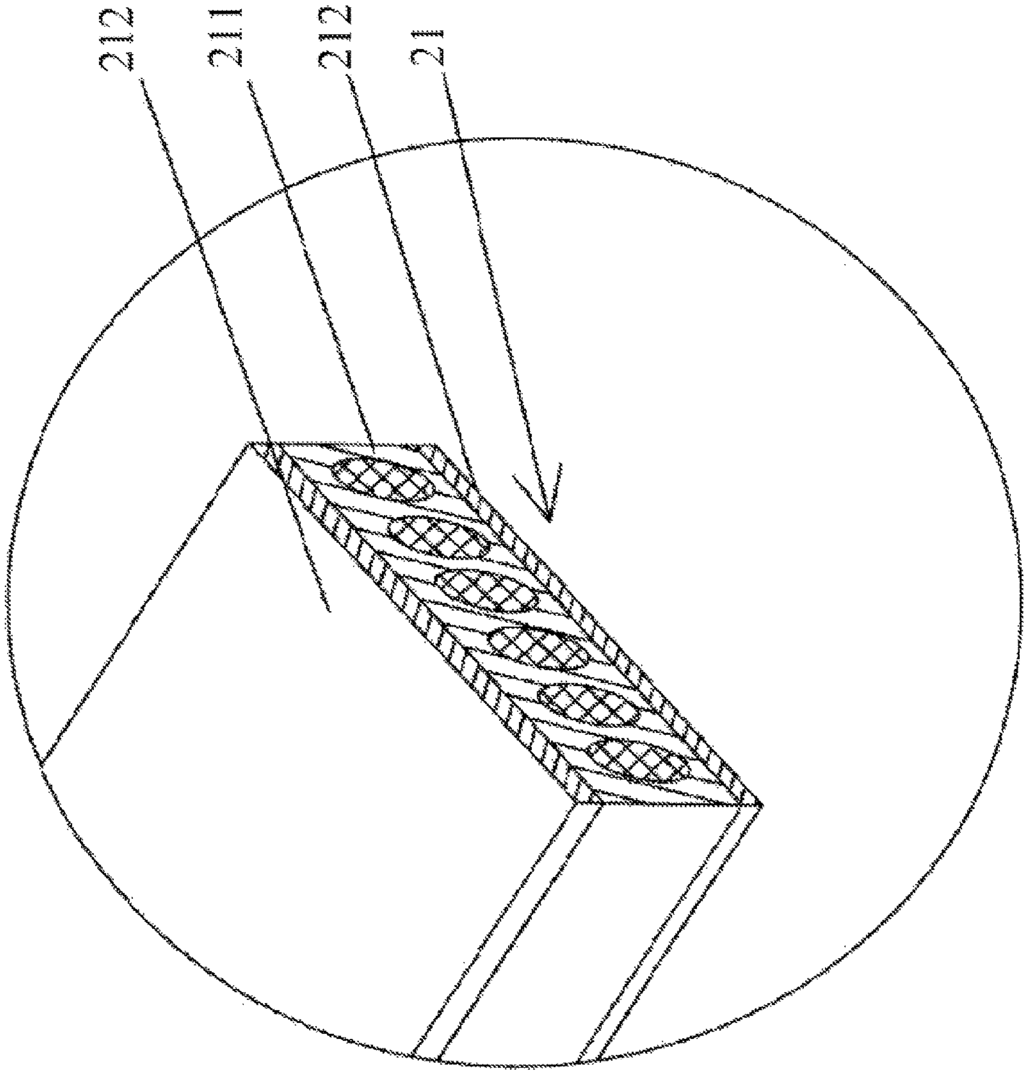
FIG. 7 is a diagram of enlarging part A of FIG. 6.

The following embodiments further illustrate a flexible flat round conductive cable created by the segmental calendering device for flexible flat cable mentioned in the aforementioned embodiments. The flexible flat round conductive cable has advantages of a less occupation and a high commonality and a low possibility of short circuit. Please refer to FIG. 6 and FIG. 7, the flexible flat round conductive cable includes a flexible flat cable 2 having a plurality of round cable segments 21. Each of the plurality of round cable segments 21 has the same width. Each of the plurality of round cable segments 21comprises a plurality of cables 211 arranged in parallel and in an equal space as well as two insulation films 212respectively disposed on an upper surface and a lower surface of the plurality of cables 211. The insulation films 212are hot melt adhesive films preferably. Specifically, the insulation films 212 are PET films. The hot melt adhesive films are applied onto the cables 211 for insulating cables of products and increasing the flexibility and the toughness of the cables. In this embodiment, the cables 211 are round conductors. Comparing to the structures of flat cables, the structures of the round conductors are capable of increasing a space between any two cables 211 for achieving the safety of cable slitting and raising the stability of techniques of product slitting. Moreover, the increased spaces are capable of decreasing the possibility of short circuits occurring between the cables 211. In the condition that original spaces are remained, the structures of round conductors are capable of decreasing the area occupations of the flexible flat cable 2. Each of two opposite ends of the flexible flat cable 2 has a reinforcing pad 22, with an upper surface of the reinforcing pads 22 having a gold finger 221 connected to the flexible flat cable 2, each of the plurality of cables 211 extending in lengthways direction and having a flat shape in a position corresponding to the reinforcing pads 22. The structures of flat shape are able to meet the demands for reliability of electric connections between the flexible flat cable 2 and other plug-in components. The flexible flat cable 2 is formed by molding the plurality of round cable segments 21 via a sub-rolling performed by the segmental calendering device. The flexible flat cable 2 has the advantage of low costs. Moreover, cable slitting could be adjusted according to clients' demands so that product specifications are reduced and the inventory risk is decreased. Furthermore, the flexible flat cable 2 has a plurality of baffles 23 disposed on two opposite ends of each of the plurality of round cable segments 21.

The following paragraphs illustrates a conductor-space controlling pole of flexible flat cable as well as an arrangement control device for controlling the electrical clearances of neighboring cables on the non-flat regions of the flexible flat cable. Please refer to FIG. 8 and FIG. 9, in this embodiment, the purpose of the conductor-space controlling pole of flexible flat cable is to generate a flexible flat cable with changeable conductor spaces. Specifically, take a conductor-space controlling pole of flexible flat cable as an example, wherein in the conductor-space controlling pole of flexible flat cable, there are two sets of left-pin wheel group and two sets of right-pin wheel group. Each of the two sets of left-pin wheel group includes two pin wheels, and each of the two sets of right-pin wheel group also includes two pin wheels.

A conductor-space controlling pole of flexible flat cable includes a mandrel 46, two sets of left-pin wheel groups and two sets of right-pin wheel groups. A first left-pin wheel group, a first right-pin wheel group, a second left-pin wheel group and a second right-pin wheel group are disposed sequentially on the mandrel 46. A set of wheel groups consisting of the first left-pin wheel group and the first right-pin wheel group, and another set of wheel groups consisting of the second left-pin wheel group and the second right-pin wheel group. First of all, a central fixing wheel 44 is fixed to the mandrel 46, and two pin wheels 41, 42 of the first right-pin wheel group are disposed on the left side of the central fixing wheel 44 and on the mandrel 46. The mandrel 46 passes through the holes of the two pin wheels 41, 42 such that a space is remained between the two pin wheels 41, 42. Two pin wheels 49, 50 of the second left-pin wheel group are disposed on the left side of the central fixing wheel 44 and on the mandrel 46. The mandrel 46 passes through the holes of the two pin wheels 49, 50 such that a space is remained between the two pin wheels 49, 50.

A first positioning wheel 40 is fixed on the left of the first right-pin wheel group and on the mandrel 46. Two pin wheels 38, 39 of the second left-pin wheel group are disposed on the left side of the first positioning wheel 40 and on the mandrel 46. The mandrel 46 passes through the holes of the two pin wheels 38, 39 such that a space is remained between the two pin wheels 38, 39.

A second positioning wheel 51 is fixed on the right side of the second left-pin wheel group and on the mandrel 46. Two pin wheels 52, 55 of the second right-pin wheel group are disposed on the right side of the second positioning wheel 51and on the mandrel 46. The mandrel 46 passes through the holes of the two pin wheels 52, 55 such that a space is remained between the two pin wheels 52, 55.

Since each of all pin wheel groups only has two pin wheels in this embodiment, the first pin wheel on the left end of the first left-pin wheel group is the pin wheel 38, and there is only one pin wheel 39 serving as the second pin wheel on the right end of the first left-pin wheel group. The first pin wheel on the left end of the second left-pin wheel group is the pin wheel 49, and there is only one pin wheel 50 serving as the second pin wheel on the right end of the second left-pin wheel group. The first pin wheel on the right end of the first right-pin wheel group is the pin wheel 42, and there is only one pin wheel 41serving as the second pin wheel on the left end of the first right-pin wheel group. The first pin wheel on the right end of the second right-pin wheel group is the pin wheel 55, and there is only one pin wheel 52 serving as the second pin wheel on the left end of the second right-pin wheel group.

The rod group includes a left merging rod, a left separating rod, a right merging rod and a right separating rod. In this embodiment, the number of each of the left merging rod, the left separating rod, the right merging rod and the right separating rod is two. Specifically, a first left merging rod 33, a second left merging rod 35, a first left separating rod 32, a second left separating rod 34, a first right merging rod 54, a second right merging rod 59, a first right separating rod 53and a second right separating rod 60 are provided.

The left merging rod and the left separating rod have a left rod body and a left toggling segment, and the right merging rod and the right separating rod have a right rod body and a right toggling segment. Both of the left rod body and the right rod body are round rods, and the left toggling segment and the right toggling segment are square rods. The section length of each of the square rods is not less than a diameter of each of the round rods.

The first left merging rod 33, the second left merging rod 35, the first left separating rod 32, the second left separating rod 34 sequentially penetrate a left fixing wheel 36, the pin wheel 38, the pin wheel 39, the first positioning wheel 40, the pin wheel 41, the pin wheel 42, the central fixing wheel 44, the pin wheel 49, the pin wheel 50 from the left side of the mandrel 46 disposed with other components. The first left merging rod 33 and the second left merging rod 35 clamp with the pin wheel 38 and the pin wheel 39, and the rest of components penetrate the pin wheel 38 and the pin wheel 39 instead of clamping the pin wheel 38 and the pin wheel 39. The first left separating rod 32 and the second left separating rod 34clamp with the pin wheel 39 and the pin wheel 50, and the rest of components penetrate the pin wheel 39 and the pin wheel 50 instead of clamping the pin wheel 39 and the pin wheel 50.

The first right merging rod 54, the second right merging rod 59, the first right separating rod 53 and the second right separating rod 60 sequentially penetrate a right fixing wheel 57, the pin wheel 55, the pin wheel 52, the second positioning wheel 51, the pin wheel 50, the pin wheel 49, the central fixing wheel 44, the pin wheel 42, the pin wheel 41 from the right side of the mandrel 46 disposed with other components. The first right merging rod 54 and the second right merging rod 59clamp with the pin wheel 55 and the pin wheel 42, and the rest of components penetrate the pin wheel 55 and the pin wheel 42 instead of clamping the pin wheel 55 and the pin wheel 42. The first right separating rod 53 and the second right separating rod 60 clamp with the pin wheel 52 and the pin wheel 41, and the rest of components penetrate the pin wheel 52 and the pin wheel 41 instead of clamping the pin wheel 52 and the pin wheel 41.

Figure 11:
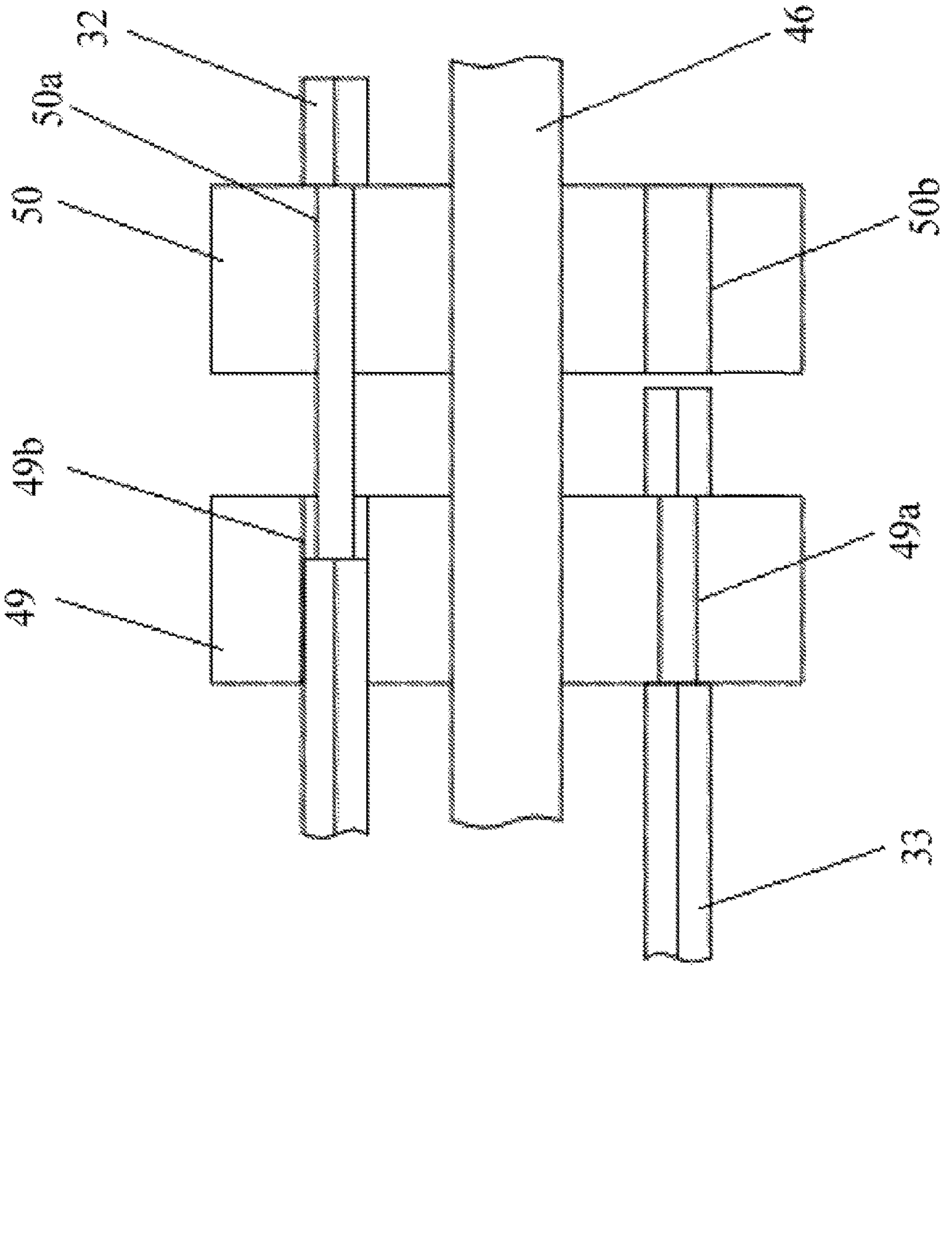
FIG. 11 is a diagram of assembly relations of a first left merging rod, a first left separating rod and pin wheels.

Please refer to FIG. 11, showing the operations regarding the merging rods, the separating rods, and the pin wheels illustrated by the first left merging rod 33, the first left separating rod 32 as well as the pin wheels 49, 50. A square hole 49*a* is formed on the pin wheel 49, with the square hole 49*a* matching the first left merging rod 33, and a round hole 49*b* is formed such that the first left separating rod 32 is capable of penetrating and rotating through the round hole 49*b*. A square hole 50*a* is formed on the pin wheel 50, with the square hole 50*a* matching the first left separating rod 32, and a round hole 50*b* is formed such that the first left merging rod 33 is capable of penetrating and rotating through the round hole 50*b*. A square rod of the head end of the first left merging rod 33 penetrates the pin wheel 49, and the round rod remains within the square hole of the pin wheel 49. Another square rod section connects to another end of the round rod section. Then, a 90-degree-rotation is performed such that by the square rods on the two ends, the pin wheel 49 is clamped within the round rod. Similarly, a square rod of the head end of the first left separating rod 33 penetrates the pin wheel 50, and the round rod remains within the square hole of the pin wheel 50. Another square rod exists after the round rod. Then, a 90-degree-rotation is performed such that the square rod on the head end of the first left separating rod 33 is not able to return from the pin wheel 50. The length of the round rod of the separating rod is configured to control a relative position between the pin wheel 49 and the pin wheel 50.

A left-control block 31 is disposed on the left end of the mandrel 46, and the right-control block 58 is disposed on the right end of the mandrel 46. The first left merging rod 33, the second left merging rod 35, the first left separating rod 32 and the second left separating rod 34 are fixed by a pin 45 when being inserted into the left-control block 31. The first right merging rod 54, the second right merging rod 59, the first right separating rod 53 and the second right separating rod 60are fixed by a pin 47 when being inserted into the right-control block 58.

Figure 8:
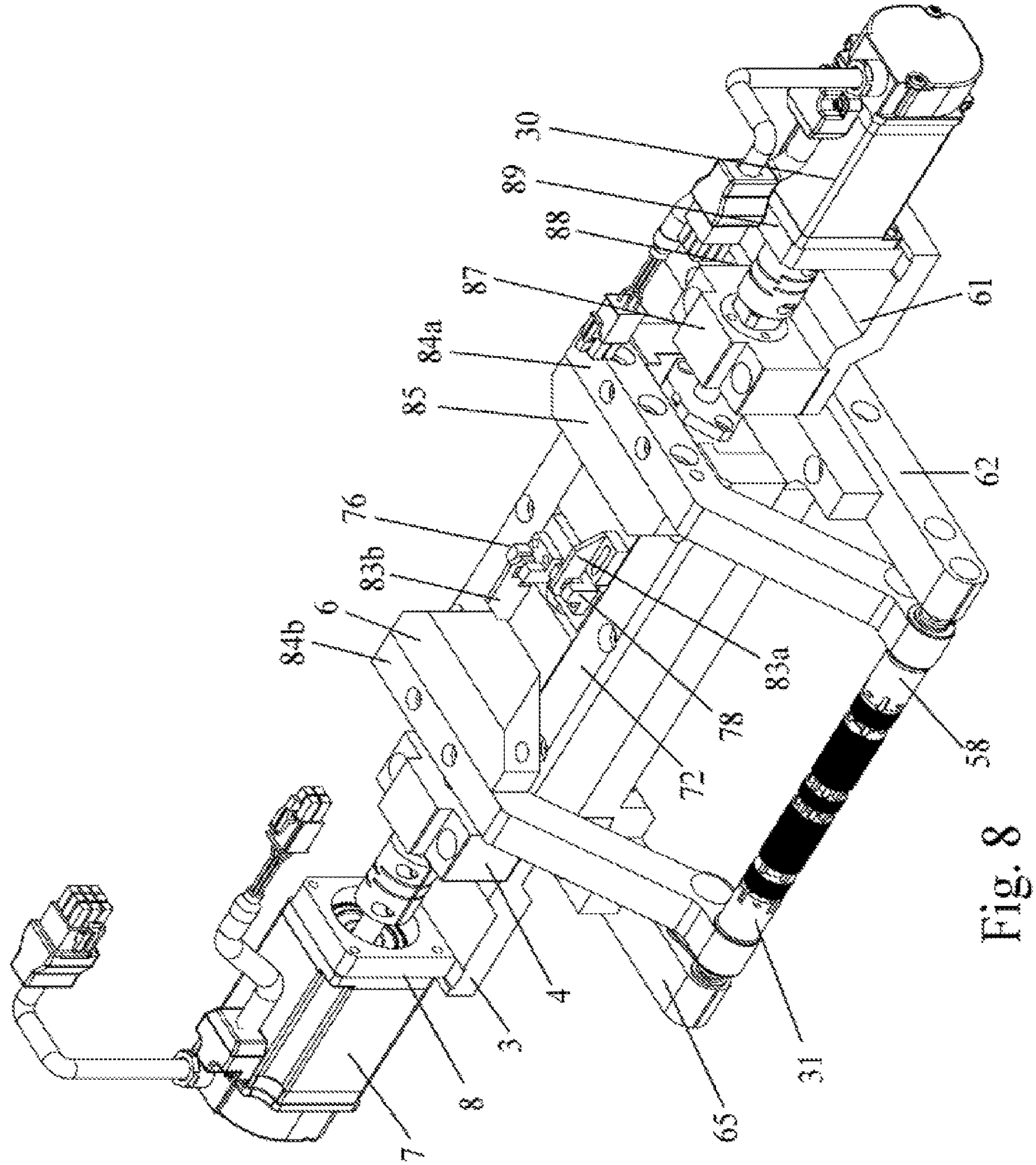
FIG. 8 is a diagram of a conductor space arrangement control device of flexible flat cable according to one embodiment of the present disclosure.
Figure 9:
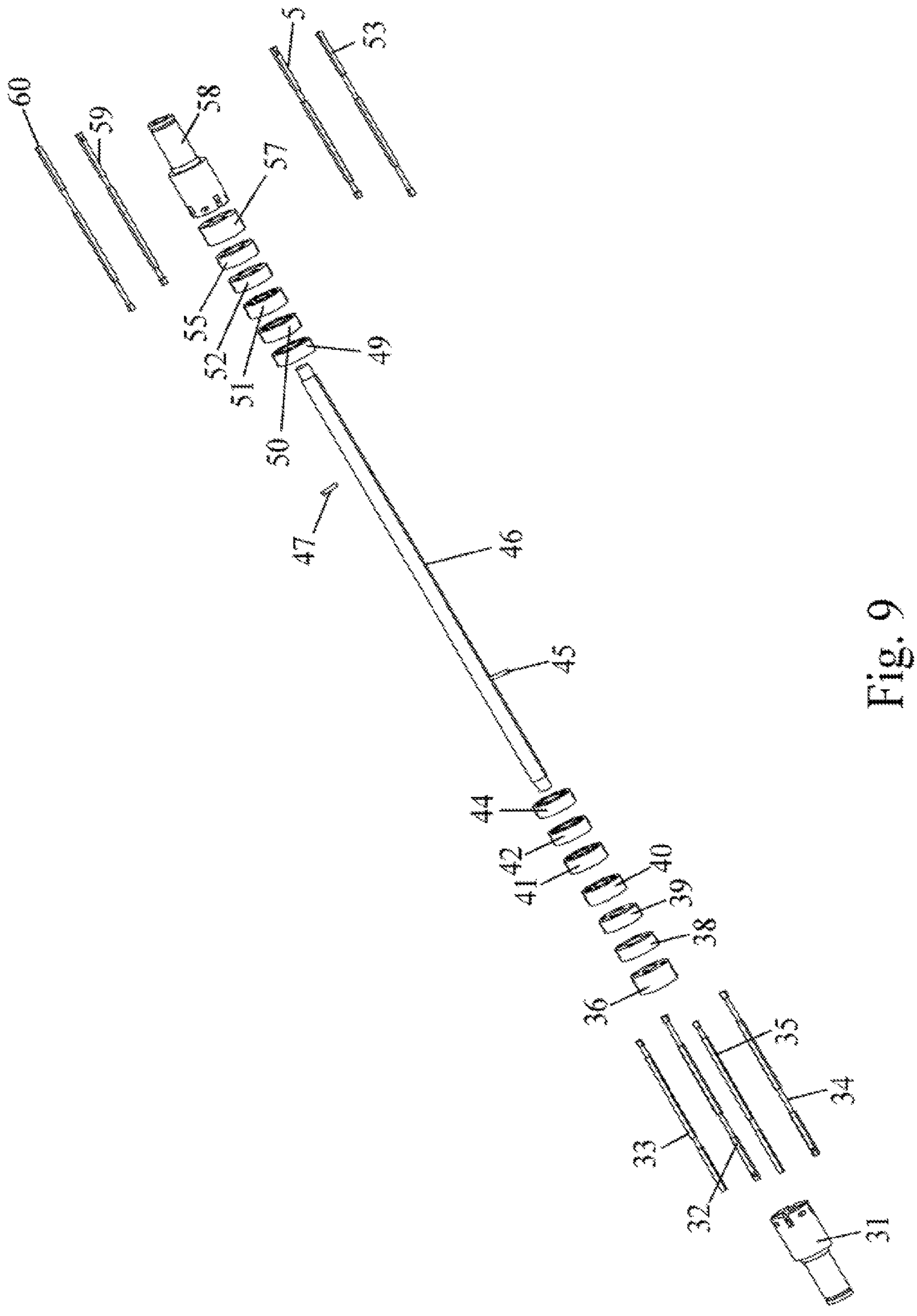
FIG. 9 is an exploded diagram of a conductor-space controlling pole of flexible flat cable according to one embodiment of the present disclosure.
Figure 10:
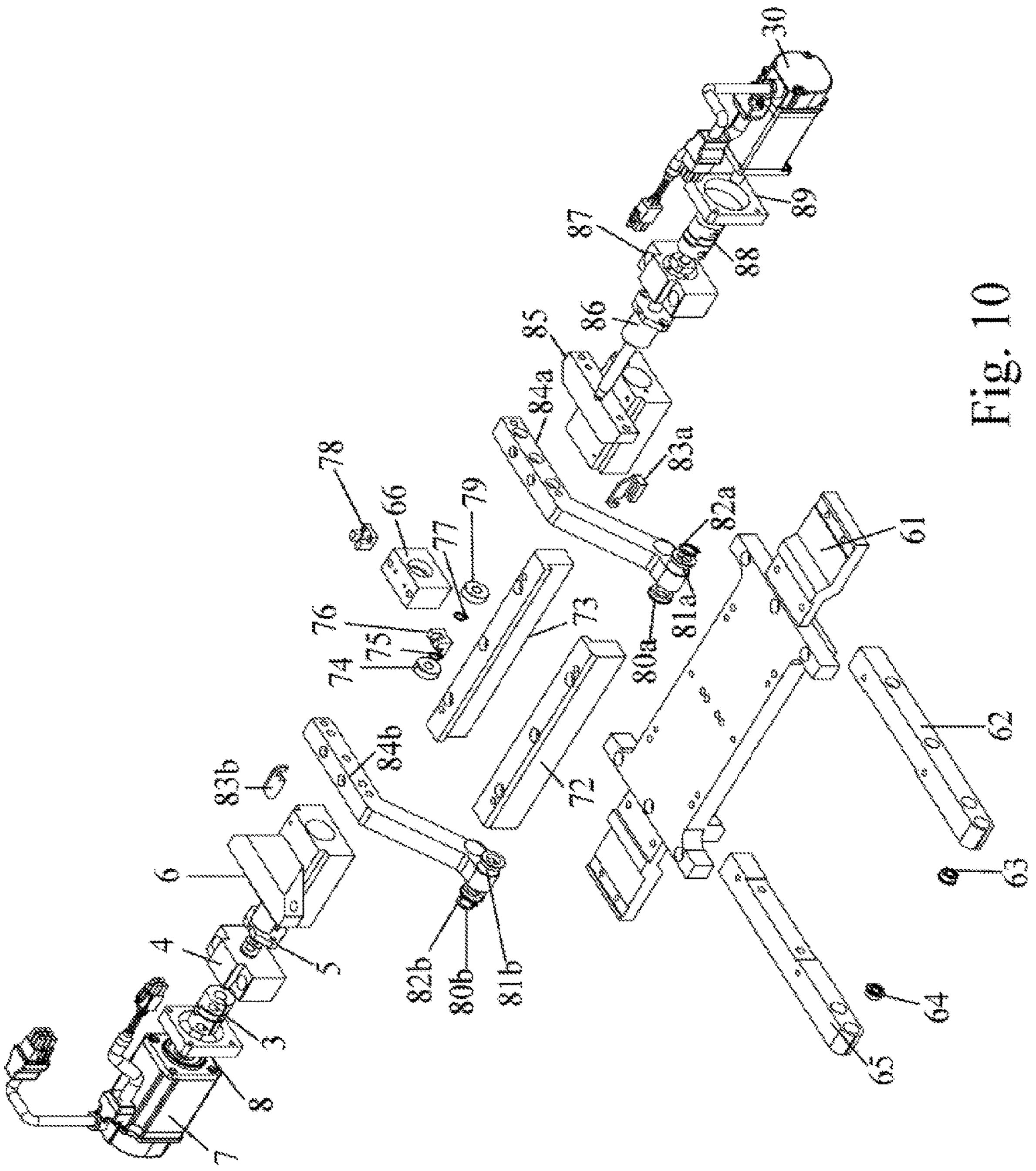
FIG. 10 is an exploded diagram of a driving part of the conductor space arrangement control device of flexible flat cable.

Please refer to FIG. 8 and FIG. 10, in a conductor space arrangement control device of flexible flat cable, a sliding rail includes a front rail 72 and a rear rail 73. The front rail 72 and the rear rail 73 are respectively disposed on the left coupling 3, and a left-shifting block 6 and a right-shifting block 85respectively slide into a rail consisting of the front rail 72 and the rear rail 73. A left screw 5 is installed into the left-shifting block 6 and the right screw 86 is installed into the right-shifting block 85. The left screw 5 and the left-shifting block 6are constructed as a kinematic pair, and the right screw 86and the right-shifting block 85 are constructed as another kinematic pair. After completing the installations of a right screw support 4 and the left screw 5 as well as a right screw support 87 and the right screw 86, both of the right screw support 87 and the right screw support 4 are fixed to a fixing board 61. Furthermore, a right servo motor 30 is fixed to a right servo motor board 89, and a left servo motor 7 is fixed to a left servo motor board 8. Then the right coupling 3 and the right coupling 88 respectively connects the left servo motor 7to the right screw rod 5, and connect the right coupling 88 to the right servo motor 30. The left servo motor board 8 and a right servo motor board 9 are respectively fixed to the fixing board 61. A left light-sensing pad 83*b* and a right light-sensing pad 83*a* are respectively installed into the left-shifting block 6 and the right-shifting block 85. A bearing 74and a bearing 79 are respectively installed onto the left screw 5 and the right screw 86, and limited by a ring 75 and a ring 77. A central supporting block 66 is installed onto the fixing board 61 for supporting the bearing 74 and the bearing 79. A left photoelectric switch 76 and a right photoelectric switch 78 are installed into the central supporting block 66.

A bearing 80*b* and a bearing 81*b* are respectively installed into the left side and the right side of the head end of the left-shifting delivering rod 84*b*. A bearing 80*a* and a bearing 81*a* are respectively installed into the left side and the right side of the head end of the right-shifting delivering rod 84*a*. The left-control block 31 is fixed to the head end of the left-shifting delivering rod 84*b* using a ring 82*b* and a ring 82*a*, and the right-control block 58 is fixed to the head end of the right-shifting delivering rod 84*a*.

A bearing 64 is installed into the left-control block 31, and a bearing 63 is installed into the right-controlling block 58. The two opposite ends of the mandrel 46 are respectively disposed with a left supporting rod 65 and a right supporting rod 62. Then, the left supporting rod 65 and the right supporting rod 62 are fixed to the fixing board 61. Finally, the left-shifting delivering rod 84*s*b is connected to the left-shifting block 6, and the right-shifting delivering rod 84*a* is connected to the right-sifting block 85.

The forward and reversal rotating of the left servo motor 7drives the left-shifting block 6 to move forward and backward through the left screw 5. The forward and reversal rotating of the right servo motor 30 drives the right-shifting block 85 to move forward and backward through the right screw 86. The left-shifting delivering rod 84*b* and the right-shifting delivering rod 84*a* deliver a sifting and a force to the left-control block 31 and the right-control block 58, and then the left-control block 31 and the right-control block 58 respectively assign the force and the shifting to the first left merging rod 33, the second left merging rod 35, the first left separating rod 32, the second left separating rod 34, the first right merging rod 54, the second right merging rod 59, the first right separating rod 53 and the second right separating rod 60 such that components connected have positions and forces to achieve the operations of separating and merging.

In a condition of merging, the pin wheel 38, the pin wheel 39, the pin wheel 41 and the pin wheel 42 move together according to the base of the first positioning wheel 40, and the pin wheel 49, the pin wheel 50, the pin wheel 52 and the pin wheel 55 move together according to the base of the second positioning wheel 51.

In a condition of separating, the pin wheel 38, the pin wheel 42, the pin wheel 49, the pin wheel 55 slide first for a distance, and then the pin wheel 39, the pin wheel 41, the pin wheel 50and the pin wheel 52 slide, so that the distances proceeded are the same.

All of the pair of the first left merging rod 33 and the first left separating rod 32, the pair of the second left merging rod 35and the second left separating rod 34, the pair of the first right merging rod 54 and the first right separating rod 53, and the pair of the second right merging rod 59 and the second right separating rod 60 operate in the same condition and the same way for achieving the merging and the separating of pin wheels.

Take one of them as an example: in a condition of merging, both of the second right merging rod 59 and the second right separating rod 60 push the pin wheel 55 and the pin wheel 42for left shifting, so that the pin wheel 55 and the pin wheel 42respectively touch the pin wheel 52 and the pin wheel 41 for shifting until both of the second positioning wheel 51 and the first positioning 40 stop. At this moment, there is a distance between the square rod on the left end of the second right separating rod 60 and the pin wheel 41. The left end of the square rod in the middle of the second right separating rod 60close to the pin wheel 41, and there is a distance between the left end of the square rod in the middle of the second right separating rod 60 and the pin wheel 52. In a condition of separating, the second right merging rod 59 directly drives the pin wheel 55 and the pin wheel 42 for right shift, and both of the pin wheel 52 and the pin wheel 41 do not move. The square rod of the left end of the second right separating rod 60 close to the left end of the pin wheel 41 and the right end of the square rod in the middle of the second right separating rod 60 close to the left side of the pin wheel 52. The square rod of the left end of the second right separating rod 60touches the left side of the pin wheel 41, the right end of the square rod in the middle of the second right separating rod 60touches the left side of the pin wheel 52 for drive the pin wheel 52 and the pin wheel 41 for right shifting.

What is claimed is:

1. A segmental calendering device for a flexible flat cable, comprising:

- a framework, including:
  - a left wallboard, with a left rolling chamber formed in the left wallboard;
  - a right wallboard, with the right wallboard disposed opposite to the left wallboard, a right rolling chamber, corresponding to the left rolling chamber, formed in the right wallboard, the right rolling chamber having the same shape and size as the left rolling chamber;
  - a supporting bar connected between the left wallboard and the right wallboard; and
  - a frame roof, with a left end of the frame roof fixed to a top of the left wallboard, a right end of the frame roof fixed to a top of the right wallboard;
- a pair of left-rolling sliding guide mechanisms fixed opposite to each other within the left rolling chamber;
- a pair of right-rolling sliding guide mechanisms fixed opposite to each other within the right rolling chamber;
- an upper-calendering roller and a supporting mechanism of the upper-calendering roller, with the upper-calendering roller rotatably supported within the supporting mechanism of the upper-calendering roller and disposed above a position between the left wallboard and the right wallboard, the supporting mechanism of the upper-calendering roller sliding along the pair of left-rolling sliding guide mechanisms and the pair of right-rolling sliding guide mechanisms;
- a lower-calendering roller disposed below the upper-calendering roller correspondingly and rotatably supported between the left wallboard and the right wallboard;
- a pressing mechanism for applying a pressure on the supporting mechanism of the upper-calendering roller and for adjusting the pressure, with the pressing mechanism disposed on the frame roof and connected to the supporting mechanism of the upper-calendering roller; and
- a space-controlling pole of the flexible flat cable, including:
  - a mandrel;
  - at least one positioning wheel fixed to the mandrel;
  - a rod group;
  - a left-control block slidably disposed on the mandrel;
  - a right-control block slidably disposed on the mandrel;
  - a left-pin wheel group configured to slide along the mandrel disposed on a left side of the positioning wheel; and
  - a right-pin wheel group configured to slide along the mandrel disposed on a right side of the positioning wheel;

wherein the left-pin wheel group and the right-pin wheel group are constructed as a set of wheel groups, each of two sides of the set of wheel groups is disposed with a fixing wheel fixed to the mandrel, the rod group comprises a left merging rod, a left separating rod, a right merging rod and a right separating rod, the left merging rod is connected to a first pin wheel of a left-side of the left-pin wheel group, the right merging rod is connected to a first pin wheel of a right-side pin wheel of the right-pin wheel group, the left separating rod toggles from a second pin wheel of the left-side of the left-pin wheel group to a pin wheel of a right-side of the left-pin wheel group when shifting left, the right separating rod toggles from a second pin wheel of the right-side of the right-pin wheel group to a pin wheel of a left-side of the right-pin wheel group when shifting right, the left-control block is connected to the left merging rod and the left separating rod, and the right-control block is connected to the right merging rod and the right separating rod.

2. The segmental calendering device for the flexible flat cable according to claim 1, wherein the left separating rod penetrates the pin wheels of the left-pin wheel group, the left separating rod comprises a left rod body and a left-toggling segment disposed on the left rod body and configured to toggle the pin wheels of the left-pin wheel group, the right separating rod penetrates the pin wheels of the right-pin wheel group, the right separating rod comprises a right rod body and a right-toggling segment disposed on the right rod body and configured to toggle the pin wheels of the right-pin wheel group.

3. The segmental calendering device for the flexible flat cable according to claim 2, wherein both of the left rod body and the right rod body are round rods, and both of the left-toggling segment and the right-toggling segment are square rods, a cross-sectional side length of each of the square rods is not less than a diameter of each of the round rods, each of the left-pin wheel group and the right-pin wheel group has two pin wheels.

4. The segmental calendering device for the flexible flat cable according to claim 1, further comprising:

- a sliding rail;
- a left-shifting delivering rod, with a head end of the left-shifting delivering rod connected to the left-control block of the space-controlling pole of the flexible flat cable;
- a right-shifting delivering rod, with a head end of the right-shifting delivering rod connected to the right-control block of the space-controlling pole of the flexible flat cable;

a left servo motor configured to drive the left-shifting delivering rod to slide along the sliding rail; and a right servo motor configured to drive the right-shifting delivering rod to slide along the sliding rail.

5. The segmental calendering device for the flexible flat cable according to claim 4, further comprising:

a left shifting block fixed to a tail end of the left shifting delivering rod;

a left screw connected to the left servo motor, with the left screw constructed with the left shifting block as a first kinematic pair;

a right shifting block fixed to a tail end of the right shifting delivering rod; and a right screw connected to the right servo motor, with the right screw constructed with the right shifting block as a second kinematic pair.

6. The segmental calendering device for the flexible flat cable according to claim 4, further comprising:

a left photoelectric switch;

a left light-sensing pad sliding with the left-shifting delivering rod;

a right photoelectric switch; and a right light-sensing pad sliding with the right-shifting delivering rod;

wherein the left photoelectric switch operates with the left light-sensing pad for controlling the left servo motor, and the right photoelectric switch operates with the right light-sensing pad for controlling the right servo motor.

7. The segmental calendering device for flexible flat cable according to claim 4, further comprising:

a baseboard, with the sliding rail fixed to the middle of the baseboard, the left servo motor and the right servo motor respectively fixed to two opposite sides of the baseboard;

a left-supporting rod; and a right-supporting rod, with the right-supporting rod and the left-supporting rod fixed to two opposite sides of the baseboard, a head end of the left-supporting rod and a head end of the right-supporting rod respectively connected to two opposite ends of the mandrel.

* * * * *